United States Patent
Kallin et al.

(10) Patent No.: US 8,494,526 B2
(45) Date of Patent: Jul. 23, 2013

(54) METHOD FOR AUTOMATICALLY SELECTING A PHYSICAL CELL IDENTITY (PCI) OF A LONG TERM EVOLUTION (LTE) RADIO CELL

(75) Inventors: Harald Kallin, Sollentuna (SE); Johan Moe, Mantorp (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 407 days.

(21) Appl. No.: 12/918,614

(22) PCT Filed: Mar. 19, 2009

(86) PCT No.: PCT/SE2009/050283
§ 371 (c)(1),
(2), (4) Date: Aug. 20, 2010

(87) PCT Pub. No.: WO2009/120137
PCT Pub. Date: Oct. 1, 2009

(65) Prior Publication Data
US 2010/0331025 A1  Dec. 30, 2010

Related U.S. Application Data

(60) Provisional application No. 61/039,154, filed on Mar. 25, 2008.

(51) Int. Cl.
*H04W 36/00* (2009.01)

(52) U.S. Cl.
USPC ........... 455/436; 455/437; 455/438; 455/439; 455/442; 455/444

(58) Field of Classification Search
USPC .. 455/426.1, 127.4, 160.1, 434, 435.1–435.3, 455/436–444, 552.1, 553.1
See application file for complete search history.

(56) References Cited

U.S. PATENT DOCUMENTS

| | | | |
|---|---|---|---|
| 5,822,696 A * | 10/1998 | Bergkvist | 455/436 |
| 6,081,711 A * | 6/2000 | Geulen | 455/432.1 |
| 6,285,874 B1 * | 9/2001 | Magnusson et al. | 455/456.1 |
| 7,398,434 B2 * | 7/2008 | Auvenshine et al. | 714/57 |

(Continued)

FOREIGN PATENT DOCUMENTS

EP  1 657 950 A  5/2006

OTHER PUBLICATIONS

Nokia Siemens Networks: "3GPP TSG-SA5 Meeting SA5#60; S5-081171; Automatic Physical Cell ID Assignment" 3GPP Draft; 3rd Generation Partnership Project (3GPP) vol. SA WG5, Jul. 11, 2008, pp. 1-5. Sophia Antipolis, France.

(Continued)

*Primary Examiner* — Dominic E Rego
(74) *Attorney, Agent, or Firm* — Myers Bigel Sibley & Sajovec, P.A.

(57) ABSTRACT

In a Long Term Evolution (LTE) cellular radio system method of selecting a physical cell id (PCI) of a LTE cell is obtained by reporting PCIs of neighbors and also a parameter indicating each neighboring cell's relevance also termed visibility to the cell. A new cell added in a cellular radio, system can then make an improved selection of a PCI already at the very first neighbor relation establishment; even if all available PCIs are already used in the vicinity.

25 Claims, 4 Drawing Sheets

U.S. PATENT DOCUMENTS

| | | | |
|---|---|---|---|
| 8,164,427 B2* | 4/2012 | Tak et al. | 340/10.5 |
| 2002/0150117 A1* | 10/2002 | Baba | 370/442 |
| 2003/0050075 A1* | 3/2003 | Rangarajan et al. | 455/456 |
| 2005/0078774 A1* | 4/2005 | Rick et al. | 375/344 |
| 2005/0148368 A1 | 7/2005 | Scheinert et al. | |
| 2006/0239228 A1* | 10/2006 | Matsuki | 370/331 |
| 2007/0066334 A1* | 3/2007 | Butts et al. | 455/522 |
| 2007/0157141 A1* | 7/2007 | Salgunan | 716/5 |
| 2007/0254620 A1* | 11/2007 | Lindqvist et al. | 455/403 |
| 2007/0258650 A1* | 11/2007 | Marchal et al. | 382/232 |
| 2008/0207207 A1* | 8/2008 | Moe et al. | 455/439 |
| 2009/0075651 A1* | 3/2009 | MacNaughtan et al. | 455/434 |
| 2009/0132675 A1* | 5/2009 | Horn et al. | 709/207 |
| 2011/0065393 A1* | 3/2011 | Pekonen et al. | 455/67.11 |

OTHER PUBLICATIONS

3GPP: "3GPP TT 36.902 V0.0.1 (Feb. 2008); XP-002534011; 3rd Generation Partnership Project; Technical Specification Group TSG RAN Evolved Universal Terrestrial Radio Access Network (E-UTRAN); Self-configuring and self-optimizing network use cases and solutions (Release 8)" Feb. 2008, pp. 1-11, Sophia Antipolis, France.

Written Opinion of the International Searching Authority, PCT Application No. PCT/SE2009/050283, Jul. 8, 2009.

International Search Report, PCT Application No. PCT/SE2009/050283, Jul. 8, 2009.

International Preliminary Report on Patentability; PCT/SE2009/050283; May 3, 2010.

Nokia Siemens Networks, Nokia: "3GPP TSG-RAN WG3 Meeting #59; R3-080376; SON Use Case: Cell Phy_ID Automated Configuration" Feb. 11, 2008, pp. 1-3. Sorrento, Italy.

Huawei: "3GPP TSG RAN WG3 Meeting #59; R3-080365; Automatic Neighbor Relation Function" Feb. 11, 2008, pp. 1-2. Sorrento, Italy.

Ericsson, Qualcomm, T-Mobile, Orange, Huawei, Teliasonera, Vodafone: "3GPP TSG RAN WG3 Meeting #59; R3-080453; Introduction of automatic neighbour relation function" Feb. 11, 2008, pp. 1-3. Sorrento, Italy.

Horn et al. "Apparatus and Method to Facilitate Reservation of Resources At an Access Point in Systems With Restricted Association", U.S. Appl. No. 60/988,646, filed Nov. 16, 2007.

* cited by examiner

METHOD FOR AUTOMATICALLY SELECTING A PHYSICAL CELL IDENTITY (PCI) OF A LONG TERM EVOLUTION (LTE) RADIO CELL

CROSS REFERENCE TO RELATED APPLICATIONS

This application is a 35 U.S.C. §371 national stage application of PCT International Application No. PCT/SE2009/050283, filed on Mar. 19, 2009, which itself claims priority to U.S. provisional patent Application No. 61/039,154, filed Mar. 25, 2008, the disclosure and content of both of which are incorporated by reference herein in their entirety. The above-referenced PCT International Application was published in the English language as International Publication No. WO 2009/120137 A1 on Oct. 1, 2009.

TECHNICAL FIELD

The present invention relates to a method and a device for selecting physical cell identity.

BACKGROUND

In a radio system using Long Term Evolution (LTE) technology, the physical cell identity—PCI—that is assigned to and transmitted by all LTE cells, is a layer 1 radio signature of which there exists 504 unique data sequences. The PCI serves as a cell signature that is easily detectable for User Equipments (UEs) connectable to the radio system. Since virtually all cellular networks deploy more than 504 cells, the PCIs will have to be reused within a network.

User Equipments use the PCI to determine and assess the relation to the serving cell and to identify neighboring cells. If two cells very close to each other use the same PCI, a terminal will have difficulties to determine if it is actually moving from one cell to another. This type of problem is here referred to as problem type 1.

The terminals in a cell typically look for neighboring cells for mobility reasons to perform handover from one cell to another. An active User equipment/terminal is normally requested to detect PCIs from neighboring cells and report any detected PCI together with some signal measure, for example the received power or the signal quality of the PCIs. If two cells in the vicinity use the same PCI, there will be difficulties in determining which of the neighbor cells a moving terminal has detected. This type of problem is here referred to as problem type 2. It is even difficult to realize that there is a problem since the ambiguity may only turn up as an increased amount of handover failures to one of the neighboring cells.

Even if the LTE standard allows for 504 different PCIs, the number of available PCIs for a cell may be substantially less than that if the operator splits the PCI space into smaller fractions. That is, an operator may choose to use one PCI range for outdoor macro cells, another range for other outdoor cells, another range for indoor systems and yet another range for home base stations. In such a scenario the number of available PCIs assignable to cells of a cellular radio network will be significantly smaller.

There have been discussions within the Third Generation Partnership Program (3GPP) to introduce an automated configuration of the Physical Cell Identity, see for example Nokia contribution R3-080376 to working group RAN3. This contribution suggests that a cell can request the PCI assignment from a neighbor, and also request a list of their neighbor cells and their corresponding PCIs over the direct evolved NodeB (eNB)-interface, X2, or via the OSS) from all its neighbors. Such an approach is illustrated to FIG. 1 where a cell requests a neighboring cell to return its neighbor list and the PCIs the neighbors use.

Traditionally, an offline planning tool would create suitable PCI values for the cells in the network and transfer these in some way to an operation support system (OSS) that in turn would assign the PCI values to the cells. The planning tool would typically distribute the PCI values in such way that the risk for a UE to run into the ambiguities described above as problem types 1 and 2 is minimized.

Using a planning tool typically causes a need for manual intervention and/or many operational steps. For example one or many of the following operations typically involve manual attention: the act of running the tool itself, considering the results, transferring the values to an OSS, assigning a PCI value to a new cell, scheduling a time for implementing PCI changes for the already existing cells, and update information storage systems about the new configuration.

It is therefore desirable to make the PCI selection and assignment process fully automatic, without any operator intervention at all or at least with less manual intervention.

Making a completely new PCI plan every time a new radio base station is introduced in the network is not desirable, since changing the PCI in a cell may have disadvantageous effects for User Equipments connected to a cell or for User Equipments in the process of moving into another cell.

Hence, there exist a need for a method and a device that enables a more effective PCI selection assigning process.

SUMMARY

It is an object of the present invention to overcome or at least reduce some of the problems as described above.

This object and others are obtained by the method and device as set out in the appended claims. Thus, by reporting PCIs of neighbors and also a parameter indicating each neighboring cell's relevance also termed visibility to the cell, a new cell added in a cellular radio system can make an improved selection of a PCI already at the very first neighbor relation establishment; even if all available PCIs are already used in the vicinity.

In accordance with one embodiment a method of automated selection of physical cell identity for a first cell is provided. A request for information is sent to at least one other cell in the vicinity of the first cell requesting data relating to the physical cell identity of the least one other cell. Information relating to the physical cell identity of said at least one other cell is then received together with a parameter indicating the relevance of the use of the corresponding physical cell identity. A node is then adapted to automatically select physical cell identity for the first cell based on the received information.

The relevance parameter can for example be a measure, a visibility measure. The visibility measure can in accordance with one embodiment be an indication of the number of measurement reports that have been received for a particular neighbor associated with a particular PCI.

In accordance with one embodiment the visibility measure can be the number of handovers actually being made to that neighbor.

The invention also extends to a node adapted to perform the method as described above.

As has been realized by the inventors, in order to automatically select and assign a suitable PCI (physical cell identity) for a cell, knowledge is needed about already used PCIs in the vicinity of the cell in question. If there is an abundance of PCI values available and the cells in the vicinity are few, the task is not particularly difficult. However, if the available PCI set is small in relation to the number of relevant cell in vicinity, for example when all PCIs are used in the vicinity of a new cell then the task is more difficult.

In order to make it possible to select a good PCI also when there is no obvious PCI available, the method and device as described herein enables not only the PCIs of neighbors to be reported to a cell, such as a new cell added in a cellular radio system, but also each cell's visibility to the reporting neighbor.

BRIEF DESCRIPTION OF THE DRAWINGS

The present invention will now be described in more detail by way of non-limiting examples and with reference to the accompanying drawings, in which.

DETAILED DESCRIPTION

Figure 1:
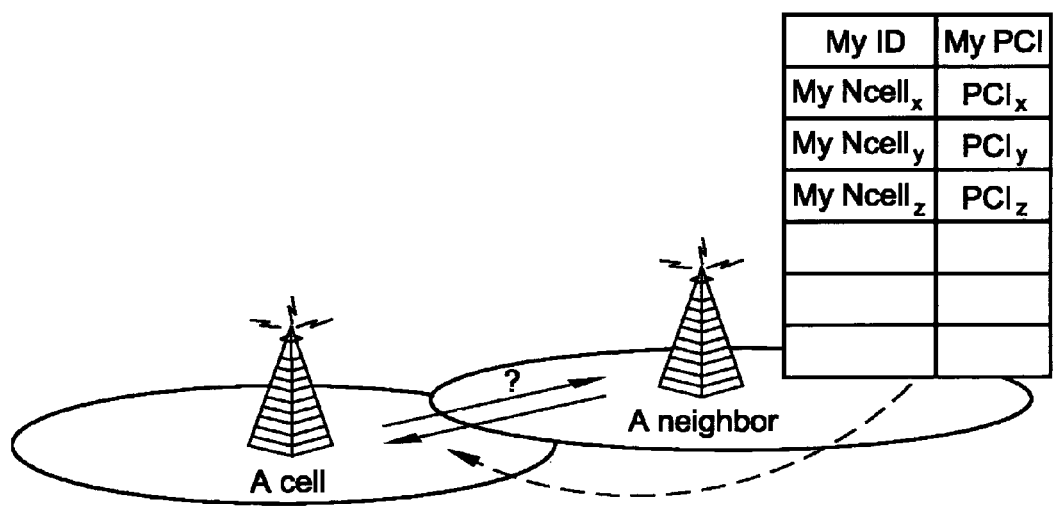
FIG. 1 is a view of a mechanism for automated Cell ID selection.

With new self-configuring features like "Automatic Neighbor Relations", it is reasonable to expect a cell to have more neighbor cells in the future, than in today's systems—which are normally based on manual planning and offline tools. Having many neighbor relations means the planning of PCIs is becoming more important. However, it is also an opportunity to gain knowledge about plenty of cells in the vicinity; thereby making it possible to avoid cases of PCI confusion. Cases that otherwise might lead to dropped calls or failed handovers.

In accordance with the present invention each cell is adapted to keep record of its neighbors and their corresponding PCIs. In addition a cell is also adapted to keep an indication of each neighbor cell's visibility; that is, their relevance.

There are different alternative methods of implementing a relevance parameter.

In a first exemplary embodiment a relevance parameter is updated in response to a PCI detection counter in the evolved NodeB (eNB) for every measurement report it receives from User Equipments containing the corresponding PCI. In one embodiment the number of unique User Equipments that have reported a detection of a PCI is used to update the relevance parameter. By letting the number of unique UEs determine the relevance parameter, the statistical skew from UEs with long communication sessions which could produce many identical measurement reports is reduced or eliminated.

In a second exemplary embodiment a relevance parameter is generated by counting the number of handovers performed to a neighboring cell and updating a corresponding PCI counter each time. This method can in a sense be said to be somewhat coarse. For example, handovers to a particular cell may be prohibited for some reason. Therefore handover event that would have taken place if they were allowed may also be counted. For completeness, all sorts of communication with the neighboring cell can in one embodiment be counted similarly. For example if the cell relation is also used for interference coordination or load balancing, the related events can also be counted.

In addition to setting the relevance parameter to a value depending on received measurement reports and to set the relevance parameter to communication within a cell, the relevance parameter can be set in response to both measurement reports and communication.

Using a combination of the two alternatives, visibility could be calculated as:

$$vis_i = \alpha * A_i + \beta * B_i \quad (1)$$

Where A is the visibility value for relation i according to received measurement reports and B is a visibility value for the amount of communication with a cell, $\alpha + \beta = 1$.

In accordance with another embodiment using a combination of several relevance parameters, visibility could be $$vis i = alfa * Ai + beta * Bi + gamma * Ci \quad (1)$$

Where Ai Bi Ci . . . are values for the visibility relevance parameters for relation i, and where the sum of the coefficients (alfa, beta, gamma . . . ) equals 1.

The visibility cannot contain too old data, as the networks—or the user behavior—are changing over time. An ageing process of the PCI counters can therefore be implemented. This can be achieved for example by actually storing the visibility counters as several sub measurements. Assume the PCI visibility counters are stored separately for every time period $T_1$ $T_2$ $T_3$ $T_4$ . . . $T_n$, where $T_1$ would represent the current measurement period and $T_n$ being the oldest measurement period. Every time a period T elapses, the measurements from period $T_n$ are discarded and the indices for the other are incremented by one.

Also, other schemes for representing the PCI visibility can be considered as well, for instance combing long term measurements (greater accuracy) with short term measurements (catching recent changes in the network).

Instead of reporting a value for the neighbors' visibility, the neighbors may be ranked according to their relevance so that the receiver of the list can make an assessment of the most relevant neighbors (PCIs) to consider.

Figure 2:
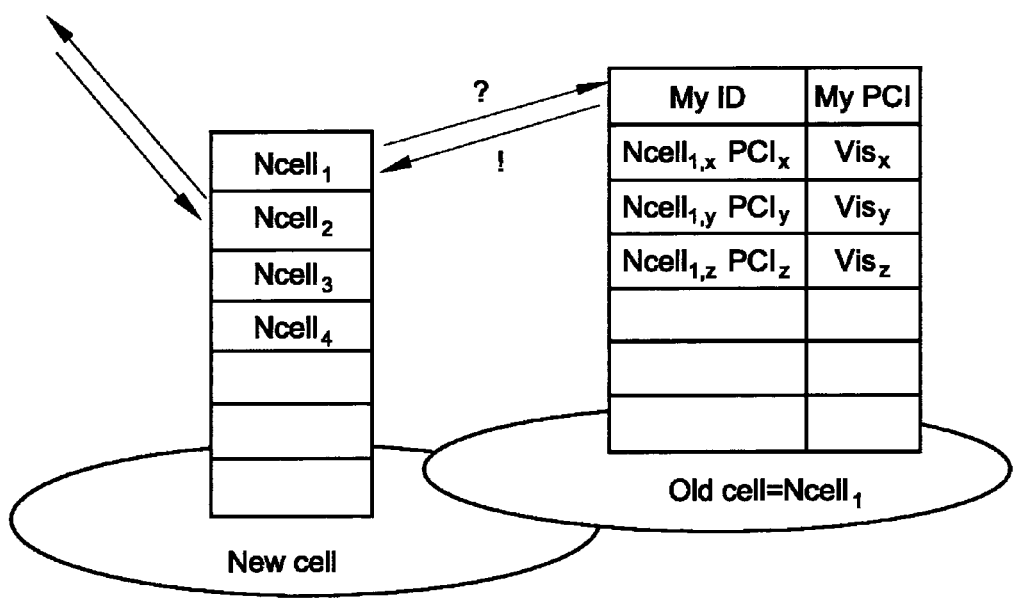
FIG. 2 is a view of an improved mechanism for automated Cell ID selection.

In FIG. 2 a view illustrating the above is shown. In the scenario in FIG. 2 . . . a new cell is being introduced into the network. In the initial operational, or even pre-operational, phase, the new cell can request from a neighbor its current PCI assignment, and also request a list of their neighbor cells and their corresponding PCIs. The request can for example be made over the direct evolved NodeB (eNB)-interface, X2, or via an OSS. In response the new cell receives a response from all its neighbors. As is depicted in FIG. 2, a neighboring cell returns not only its neighbor list with cell identities and their PCIs, it also provides a relevance parameter such as a visibility indicator for each PCI. In one embodiment, to address the scenario described herein, it would not be necessary to return any cell identities, just the PCIs and their corresponding relevance parameter.

Thus, when a cell requests the neighbor cell list and their related PCIs from a cell or an OSS, the response will in accordance with one embodiment also contain a relevance parameter for each neighbor.

Whenever a cell is in operation, it needs to have a PCI allocated to it. If the selected PCI for a new cell happens to be used in a nearby cell, the terminals in the area will experience problems. In accordance with one embodiment the network can be adapted to handle a small pool of reserved PCIs that are truly unique within the network, or at least guaranteed to be unique in a particular area of the network. The term "unique", is here defined as not used by more than one cell at any given time.

Assume a scenario of self-configuring networks, where a new cell is going to be brought into operation without any prior configuration or knowledge of which PCI to use or what neighbor cells it may have.

The new cell starts by requesting a PCI from the pool of reserved PCIs. That is, it is not used elsewhere in a large neighborhood, such as a state or a county, which it then may start to use. As soon as the cell starts to operate, it may attract terminals that will report about neighboring cells, as well as terminals in surrounding cells may detect the new cell as a potential neighbor and report its existence to their serving cell. When a neighboring cell has been detected, other functions like Automatic Neighboring Cells may automatically establish cell relations between the new cell and existing cells.

As soon as the first neighbor is established, the new cell can immediately request information from this neighbor about its neighbors and their PCIs. The new cell can use this neighbor information to request the same information from the cells included in the reply or get it from the first cell, assuming it can make the inquiry to its neighbors or already has the information available.

In this way, the new cell can very quickly get a good understanding of all PCIs used in the vicinity. Even if the first established neighbor happened not to be the most important neighbor, a list of the neighbors and the neighbors' neighbors will still be very exhaustive.

The new cell may now immediately scrutinize the PCI allocation among the neighbors and pick an unused PCI and then start to use this new PCI. In one embodiment the cell after picking a normal PCI then also "return" the unique PCI to the pool of reserved PCIs to the entity handling this pool for example an OSS to be used when adding additional cells in the network.

If it turns out that there is no unused PCI among the neighbors, and possibly in the extended area including for example the neighbors' neighbors, the new cell can be adapted to select the least visible PCI in the examined set, i.e. the PCI having the lowest relevance parameter in accordance with the implemented relevance determination method. The new cell can in an alternative embodiment be adapted to select the least visible PCI among of the least visible neighbor cell.

The scenarios described above describe the new cell performing the steps of collecting and evaluating PCIs and their visibilities, and deciding a PCI for the new cell. These steps could also be handled by another entity, such as a central OSS node.

Figure 3:
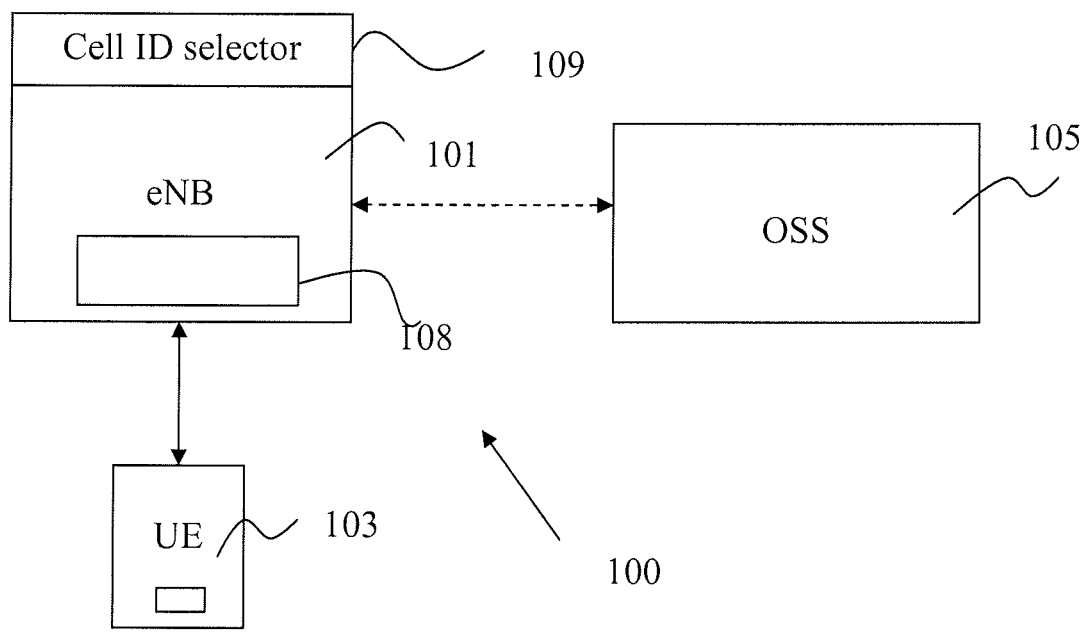
FIG. 3 is a view of selected parts of a cellular radio system.

In FIG. 3 a simplified view of a cellular radio system comprising entities used in selection of physical cell identity for a cell in a cellular radio system 100. The system comprises a number of radio base stations here denoted evolved Node B (eNB) 101. The eNBs 101 can be connected via an OSS 105. The base stations 101 are further connectable to User Equipments 103 of the radio system 100 over a radio interface. In order to select physical cell Id in accordance with the above an eNB 101 can comprise a selector 109. The selector 109 can, as set out above, also be located in a central node, such as in an OSS.

In addition to a selector 109 the eNB 101 can comprise a message/relevance generator 108. The purpose of the generator is to request relevance information from neighboring eNBs and also to generate relevance information relating to the eNB 101 for use by other eNBs 101 in response to a request for such data.

Figure 4:
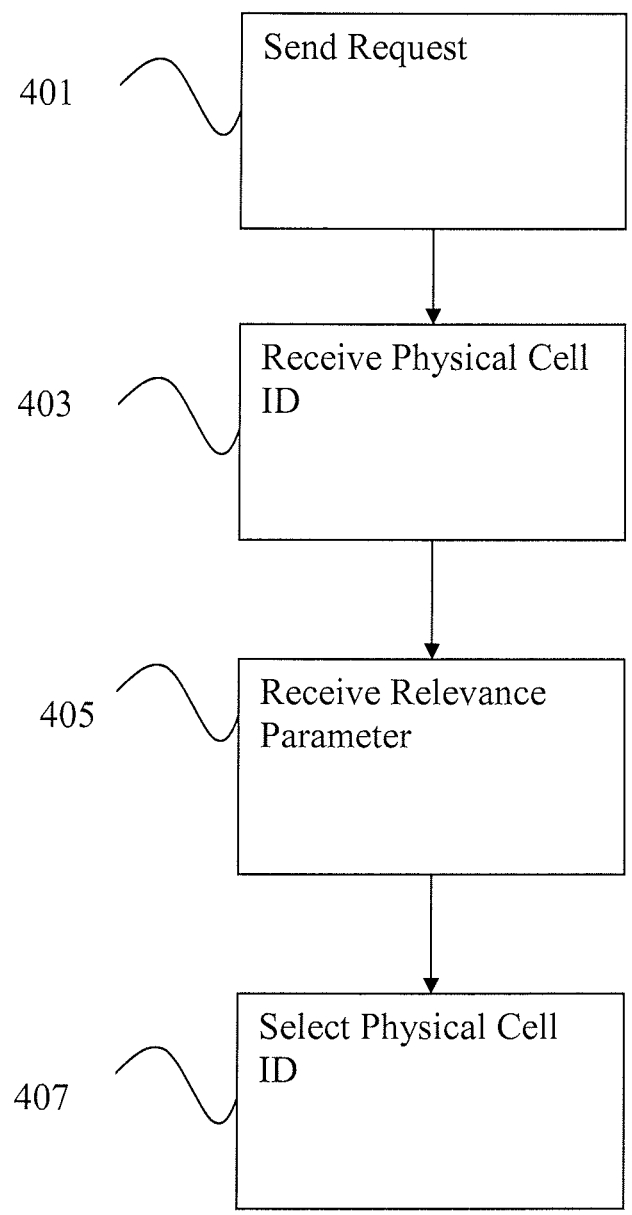
FIG. 4 is a flow chart illustrating steps performed when performing automated cell ID selection in a cellular radio system.

In FIG. 4, some steps of the method as described above are depicted in a flow chart. The procedural steps are described in the context of a radio base station sending requests and receiving data, but it is understood that some or all steps can be performed by another entity such as a central node, for example an OSS. First, in a step 401 a radio base station requests relevance information by sending a request for information to at least one other cell in the vicinity of the first cell requesting data relating to the physical cell identity of the at least one other cell. Next in a step 403, the radio base station receives information relating to the physical cell identity of the at least one other cell. The radio base station also receives a parameter indicating the relevance of the use of the corresponding physical cell identity in a step 405. Next, in a step 407, an automatic selection of physical cell identity for the cell of the radio base station based on the received information is made.

It is to be understood that the proposed methods and devices as described above will work for any radio technology, for example and not limited to LTE, WCDMA or GSM. However, in for example WCDMA the PCI is instead often referred to as scramble code.

It shall also be obvious for anyone skilled in the art that the algorithm may as well run centrally either in an OSS (referred to as domain manager in 3GPP) or NMS.

Using the methods and devices as described herein enables an automatic and distributed selection of PCI for base stations, even in situations where there is a relative shortage of available PCIs. The method makes an intelligent selection of a PCI that is likely to not cause any PCI conflicts. The risk for having to change the PCI later on, or to encounter repeatedly changes of the PCIs, is therefore significantly reduced and allow for a fully automatic management of the PCI allocation. This solves the problem of the need to use pre-planning, use central planning schemes (nodes), or the problem of ending up in a situation where it is difficult to make a good PCI selection.

The invention claimed is:

1. A method of automated selection of physical cell identity for a first cell, the method comprising:
    sending a request for information to at least one other cell in the vicinity of the first cell requesting data relating to the physical cell identity of said at least one other cell;
    receiving information relating to the physical cell identity of said at least one other cell together with a parameter indicating the visibility of the use of the corresponding physical cell identity; and
    automatically selecting physical cell identity for the first cell based on the received information.

2. The method according to claim 1, wherein information from each neighboring cell is received.

3. The method according to claim 1, further comprising:
    transmitting a list of the visibility for all known cells and their indicated visibility.

4. The method according to claim 3, wherein the list is transmitted to another cell or to an operation support system.

5. The method according to claim 4, wherein the received information comprising the parameter indicating the visibility of the use of the corresponding physical cell identity also comprises visibility information and physical cell information related to the neighbor cells of said at least one other cell.

6. The method according to claim 1, wherein the physical cell identity is selected to use an identity from an allowed set and which identity is not in use by a neighboring cell or in any cell visible in any neighbor cell.

7. The method according to claim 1, wherein the physical cell identity is selected for the first cell to use an identity from an allowed set and which identity is associated with a low visibility in a cell having a low visibility, and wherein the first cell comprises a newly-added cell in a cellular radio system that includes the cell having the low visibility.

8. The method according to claim 1, wherein the physical cell identity is selected to use an identity from an allowed set and which identity is associated with the lowest visibility in the cell having the lowest visibility.

9. The method according to claim 1, wherein the visibility is determined in response to the number of measurement reports.

10. The method according to claim 1, wherein the visibility is determined in response to the number of handovers performed in a cell.

11. The method according to claim 1, wherein the visibility is determined in response to the visibility in interference measurements of the cell.

12. The method according to claim 1, wherein the selection is made in a base station.

13. The method according to claim 1, wherein the selection is made in a central node.

14. The method according to claim 1, wherein the visibility parameter is set in response to activity within a recent time period.

15. The method according to claim 14, wherein the visibility parameter is set in response to activity as a weighted average of long term and short term activity.

16. The method according to claim 1, where the visibility parameter indicates a ranking of the neighbor cells.

17. The method of claim 1, wherein the parameter indicating the visibility of the use of the corresponding physical cell identity comprises a parameter indicating frequency of the use of the corresponding physical cell identity.

18. A node adapted to select physical cell identity for a first cell comprising:

means for sending a request for information to at least one other cell in the vicinity of the first cell requesting data relating to the physical cell identity of said at least one other cell;

means for receiving information relating to the physical cell identity of said at least one other cell together with a parameter indicating the visibility of the use of the corresponding physical cell identity, and means for automatically selecting physical cell identity for the first cell based on the received information.

19. The node according to claim 18, comprising means for receiving information from each neighboring cell.

20. The node according to claim 18, further comprising:

means for transmitting a list of the visibility for all known cells and their indicated visibility.

21. The node according to claim 20, comprising means for transmitting the list to another cell or to an operation support system.

22. The node of claim 21, wherein the received information comprising the parameter indicating the visibility of the use of the corresponding physical cell identity also comprises visibility information and physical cell information related to the neighbor cells of said at least one other cell.

23. The node of claim 18, wherein the parameter indicating the visibility of the use of the corresponding physical cell identity comprises a parameter indicating frequency of the use of the corresponding physical cell identity.

24. The node of claim 18, further comprising means for selecting the physical cell identity for the first cell to use an identity from an allowed set and which identity is associated with a low visibility in a cell having a low visibility, and wherein the first cell comprises a newly-added cell in a cellular radio system that includes the cell having the low visibility.

25. The node of claim 18, further comprising means for determining the visibility in response to the visibility in interference measurements of the cell.

* * * * *